United States Patent
Shikata et al.

(10) Patent No.: US 6,877,550 B2
(45) Date of Patent: Apr. 12, 2005

(54) VEHICLE AIR CONDITIONER

(75) Inventors: Kazushi Shikata, Kariya (JP); Satoshi Mizutani, Nagoya (JP); Tomohiro Kamiya, Takahama (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/417,587

(22) Filed: Apr. 17, 2003

(65) Prior Publication Data

US 2003/0192668 A1 Oct. 16, 2003

Related U.S. Application Data (63) Continuation-in-part of application No. 09/906,193, filed on Jul. 16, 2001, now abandoned.

(30) Foreign Application Priority Data

Jul. 21, 2000 (JP) ........................... 2000-220917
May 11, 2001 (JP) ........................... 2001-142209

(51) Int. Cl.$^7$ ............... F25B 29/00; B60H 1/00; B60H 3/00; B60H 1/32
(52) U.S. Cl. ............... 165/43; 165/42; 165/203; 454/121; 454/156; 454/158; 237/12.3 A; 237/12.3 B; 62/244; 62/285; 62/279; 62/288; 415/206
(58) Field of Search .................. 62/285, 279, 288, 62/244; 165/42, 43, 203; 454/121, 156, 158; 237/12.3 A, 12.3 B; 415/206

(56) References Cited

U.S. PATENT DOCUMENTS

| | | | |
|---|---|---|---|
| 912,133 A | * | 2/1909 | Kellogg |
| 2,511,549 A | | 6/1950 | Simi |
| 2,728,206 A | | 12/1955 | Newton et al. |
| 4,390,124 A | | 6/1983 | Nilsson |
| 4,576,549 A | * | 3/1986 | Lanier |
| 5,399,068 A | * | 3/1995 | Park |
| 5,711,368 A | * | 1/1998 | Ito et al. |
| 5,755,107 A | | 5/1998 | Shirota et al. |
| 6,029,739 A | | 2/2000 | Izawa et al. |

FOREIGN PATENT DOCUMENTS

| | | |
|---|---|---|
| EP | 0169040 A2 | 1/1986 |
| JP | A-52-23844 | 2/1977 |
| JP | A-54-59605 | 5/1979 |
| JP | 4-349016 | * 12/1992 |
| JP | A-6-58564 | 3/1994 |
| JP | A-6-156049 | 6/1994 |
| JP | A-8-104129 | 10/1994 |
| JP | A-8-268040 | 10/1996 |
| JP | A-10-58963 | 3/1998 |
| JP | A-10-71823 | 3/1998 |
| JP | A-10-71846 | 3/1998 |
| JP | A-10-82550 | 3/1998 |
| JP | A-11-147417 | 6/1999 |

* cited by examiner

*Primary Examiner*—John K. Ford
(74) *Attorney, Agent, or Firm*—Harness, Dickey & Pierce, PLC (57) ABSTRACT

In a vehicle air conditioner, an evaporator is disposed at an upper side of a blower approximately horizontally so that air blown by the blower passes through the evaporator from below upwardly. The evaporator is slightly tilted from a horizontal surface by a predetermined angle, and the blower is disposed in such a manner that air is mainly blown by the blower toward the evaporator in a direction substantially parallel to a tangential line at a scroll finish portion of the scroll casing. Accordingly, condensed water on a bottom heat-exchanging surface of the evaporator can be pushed downwardly by component force of the flow of air mainly blown from the blower.

13 Claims, 12 Drawing Sheets

VEHICLE AIR CONDITIONER

CROSS-REFERENCE TO RELATED APPLICATION

This application is a CIP application of U.S. application Ser. No. 09/906,193, filed on Jul. 16, 2001 now abandoned. This application is related to Japanese Patent Applications No. 2000-220917 filed on Jul. 21, 2000, and No. 2001-142209 filed on May 11, 2001, the contents of which are hereby incorporated by reference.

BACKGROUND OF THE INVENTION

1. Field of the Invention

The present invention relates to a vehicle air conditioner, which effectively improves draining performance of condensed water in a cooling heat exchanger while reducing a size of an interior unit disposed in a passenger compartment.

2. Description of Related Art

In a conventional vehicle air conditioner described in JP-A-6-156049, a cooling heat exchanger and a heating heat exchanger are disposed at an upper side of a blower so that a dimension of an interior unit in a horizontal direction is reduced, and a mounting space in the vehicle is reduced. Further, in this air conditioner, a heat-exchanging surface of a cooling heat exchanger (e.g., evaporator) is tilted from a horizontal surface by a predetermined angle, and a drain pipe for draining condensed water is disposed at a tilted lower end side of the cooling heat exchanger. However, a main flow of air blown by a blower is toward the tilted lower end side of the cooling heat exchanger, and air passes through the cooling heat exchanger from below upwardly. Therefore, a flow of condensed water flowing toward the drain pipe along the inclination of the cooling heat exchanger is disturbed by the main flow of air blown by the blower. Accordingly, draining performance of the cooling heat exchanger is deteriorated, and water-staying amount in the cooling heat exchanger is increased. As a result, condensed water is splashed about a downstream air side of the cooling heat exchanger, and air-flowing resistance in the cooling heat exchanger is increased.

SUMMARY OF THE INVENTION

In view of the foregoing problems, it is an object of the present invention to provide a vehicle air conditioner, in which draining performance of condensed water in a cooling heat exchanger can be improved while a mounting space of an interior unit disposed in a passenger compartment can be made smaller.

It is an another object of the present invention to provide a vehicle air conditioner which prevents a noise generated due to condensed water falling onto a centrifugal fan from a bottom surface of a cooling heat exchanger.

According to the present invention, in a vehicle air conditioner, a cooling heat exchanger for cooling air is disposed at an upper side of a blower approximately horizontally in such a manner that air blown from the blower passes through the cooling heat exchanger upwardly from below, the cooling heat exchanger has a bottom heat-exchanging surface tilted by a predetermined angle relative to a horizontal surface, and a scroll casing of the blower is disposed such that a dimension y from a center of a centrifugal fan to an outer peripheral surface of the scroll casing is gradually increased from a scroll start portion to a scroll finish portion, and air is mainly blown toward the cooling heat exchanger in a direction substantially parallel to a tangential line (T) at the scroll finish portion. Further, the blower is disposed such that an extension line of the tangential line is crossed with the bottom heat-exchanging surface in the tilt direction by an acute angle. Because the cooling heat exchanger is arranged at the upper side of the blower, a mounting space of an interior unit including the blower and the cooling heat exchanger on a vehicle can be reduced. In addition, because the tangential line at the scroll finish portion of the scroll casing is crossed with the bottom heat-exchanging surface in the tilt direction by the acute angle, the main flow of air blown by the blower pushes condensed water on the bottom heat-exchanging surface of the cooling heat exchanger downwardly, and the draining performance can be improved. That is, the component force of the air pressure from the centrifugal fan is generated in the tilt direction of the bottom heat-exchanging surface of the cooling heat exchanger due to the main air flow substantially parallel to the tangential line at the scroll finish portion of the scroll casing. Accordingly, the draining performance of condensed water on the bottom heat-exchanging surface of the cooling heat exchanger is further improved due to the component force of the main flow of air blown from the blower.

Preferably, the scroll casing is formed into a scroll shape having a scroll winding angle from the scroll start portion toward the scroll finish portion, and the scroll winding angle at the scroll finish portion is in a range of 290°–310° Further, the scroll start portion is positioned under the cooling heat exchanger at a lower side of the tilted cooling heat exchanger, and the scroll finish portion is positioned under the cooling heat exchanger at an upper side of the tilted cooling heat exchanger. Therefore, condensed water collected on the lower end of the tilted cooling heat exchanger can smoothly fall downwardly without being disturbed by a pressure of the main flow of air blown by the blower. Accordingly, even when the cooling heat exchanger is disposed approximately horizontally at the upper side of the blower, draining performance of condensed Water in the cooling heat exchanger can be improved.

Preferably, the scroll start portion is provided in the scroll casing to completely cover an upper side of the centrifugal fan when being viewed from an upper side of the centrifugal fan. Accordingly, even when condensed water falls from the bottom surface of the cooling heat exchanger, condensed water does not fall onto the rotating centrifugal fan at the scroll start portion, and noise, generated due to the condensed water falling onto the rotating centrifugal fan, can be prevented.

More preferably, the cooling heat exchanger is tilted in such a manner that a vehicle front side end of the cooling heat exchanger becomes higher than a vehicle rear side end of the cooling heat exchanger. In this case, because air from the cooling heat exchanger can be relatively linearly introduced into a face opening through which air flows toward an upper side of the passenger compartment, air flow resistance in a face mode can be reduced.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
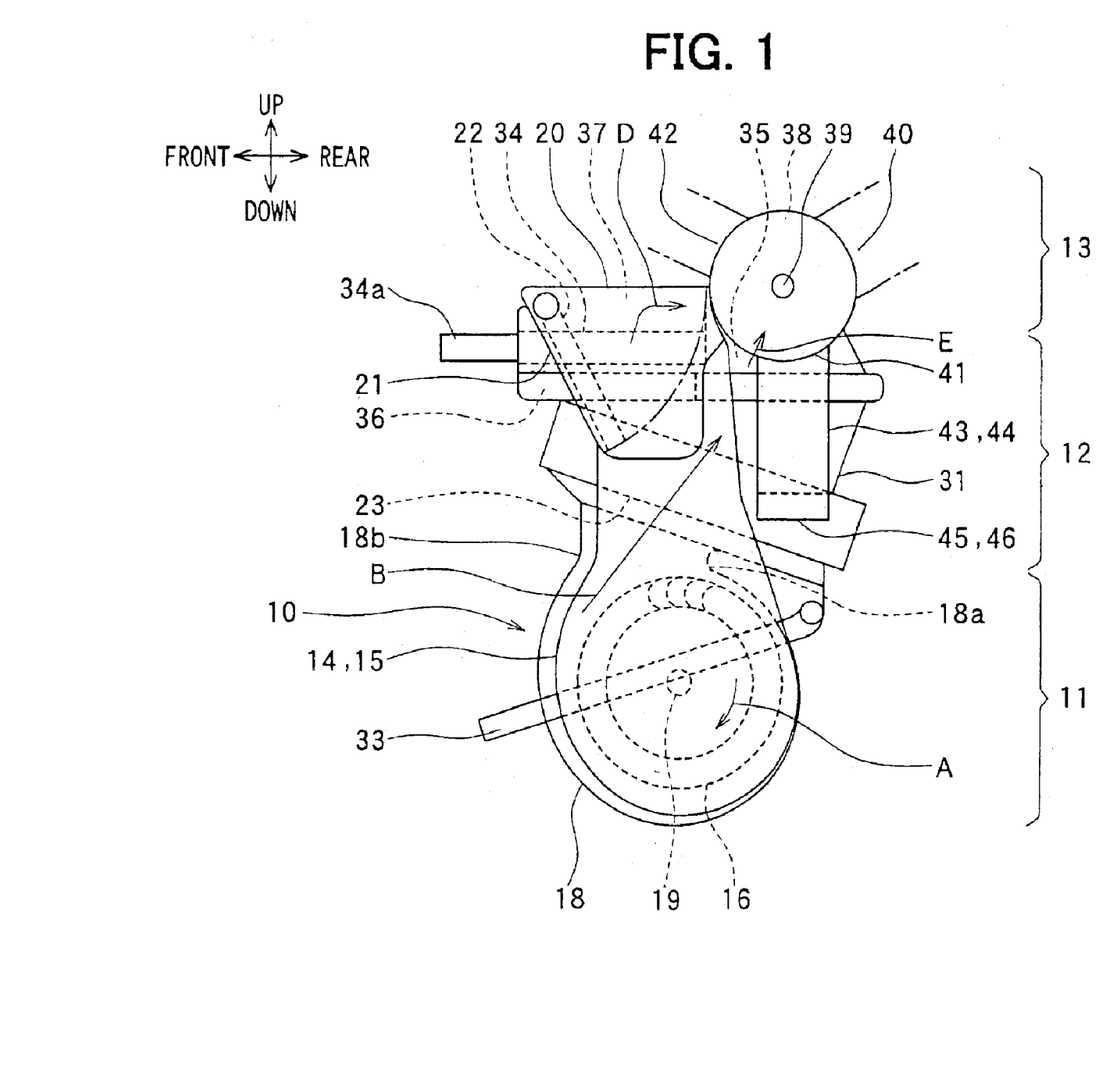
FIG. 1 is a side view of an interior unit of a vehicle air conditioner, provided in a passenger compartment, according to a first preferred embodiment of the present invention.
Figure 2:
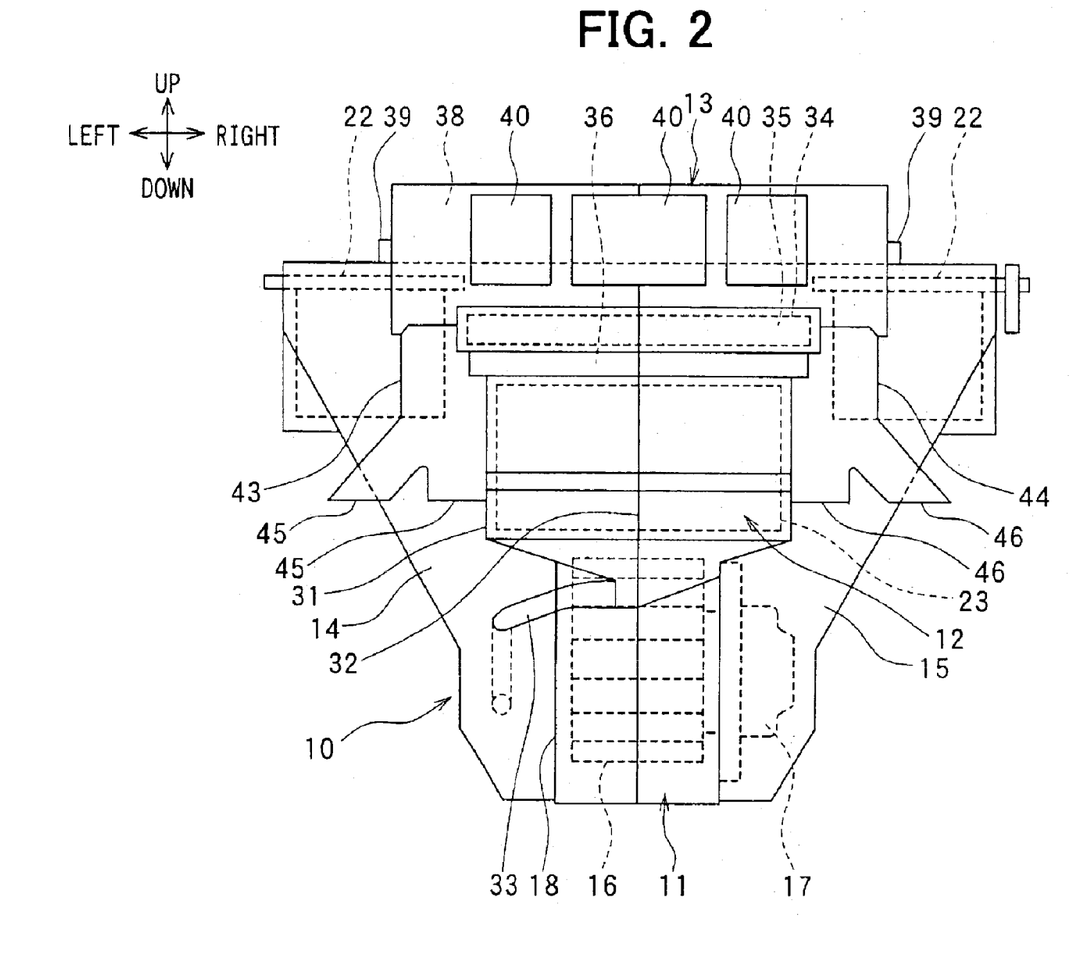
FIG. 2 is a front view of the interior unit in FIG. 1, when being viewed from an inner side of the passenger compartment.

A first preferred embodiment of the present invention will be now described with reference to FIGS. 1–5. FIGS. 1 and 2 show a mounting state of an interior unit 10 of a vehicle air conditioner, on a vehicle. The arrangement of the interior unit 10 on the vehicle corresponds to the arrangement in FIGS. 1 and 2, in a vehicle front-rear direction, a vehicle up-down direction and a vehicle right-left direction. The interior unit 10 is disposed in an instrument panel within a passenger compartment, at an approximate center in the vehicle right-left direction.

As shown in FIG. 1, the interior unit 10 includes a blower 11 disposed at a lower side portion in the vehicle up-down direction, a heat-exchanging portion 12 disposed at a middle portion in the vehicle up-down direction, and a mode switching portion 13 disposed at an upper side portion in the vehicle up-down direction. That is, the blower unit 11, the heat-exchanging portion 12 and the mode switching portion 13 of the interior unit 10 are arranged in the vehicle up-down direction to construct a vertical layout. Inside/outside air introduction ducts 14, 15 are disposed at both right and left sides of the elements 11–13 of the interior unit 10.

The blower 11 includes a blower fan 16, a motor 17 for driving the blower fan 16 and a resinous scroll casing 18 for receiving the blower fan 16. The blower fan 16 is constructed by a centrifugal multiblade fan (sirocco fan) having plural blades each of which is bent in a circular arc shape. Further, the blower fan 16 and the motor 17 are disposed so that a rotation axis 19 (center line) of the blower fan 16 and the motor 17 is arranged in a horizontal direction (e.g., the vehicle right-left direction).

The scroll casing 18 is disposed so that a scroll start portion (nose portion) 18a of the scroll casing 18 is positioned at a vehicle rear side and a scroll finish portion 18b is positioned at a vehicle front side, as shown in FIG. 1. Here, a scrolling direction of the scroll casing 18 is in a direction where a radial dimension of the scroll shape is gradually enlarged from the scroll start portion (nose portion) 18a to the scroll finish portion 18b.

The blower fan 16 rotates in the scrolling direction of the scroll casing 18 so that air discharged from the blower fan 16 flows along the scrolling direction within the scroll casing 18. Further, two air suction ports (not shown) are provided in two side surface portions of the scroll casing 18, respectively, in the right-left direction, so that air is sucked from the two air suction ports at both sides in the vehicle right-left direction, for the single blower fan 16. Downstream end portions of the inside/outside air introduction ducts 14, 15 are connected to both the right and left air suction ports of the scroll casing 18. As shown in FIG. 2, the inside/outside air introduction ducts 14, 15 extend from both the air suction ports upwardly along right and left sides of the heat-exchanging portion 12, and upper end portions (upstream end portions) of the inside/outside air introduction ducts 14, 15 are positioned at a vehicle front side of the mode switching portion 13.

At the upper end portions of the inside/outside air introduction ducts 14, 15, an outside air introduction port 20 and an inside air introduction port 21 are provided, respectively. In addition, an inside/outside air switching door 22 is rotatably disposed at an inner side of the air introduction ducts 14, 15 to open and close the outside air introduction port 20 and the inside air introduction port 21. Accordingly, by selectively opening and closing the outside air introduction port 20 and the inside air introduction port 21 due to the rotation operation of the inside/outside air switching door 22, inside air inside the passenger compartment or outside air outside the passenger compartment can be selectively introduced into the blower 11.

Figure 3:
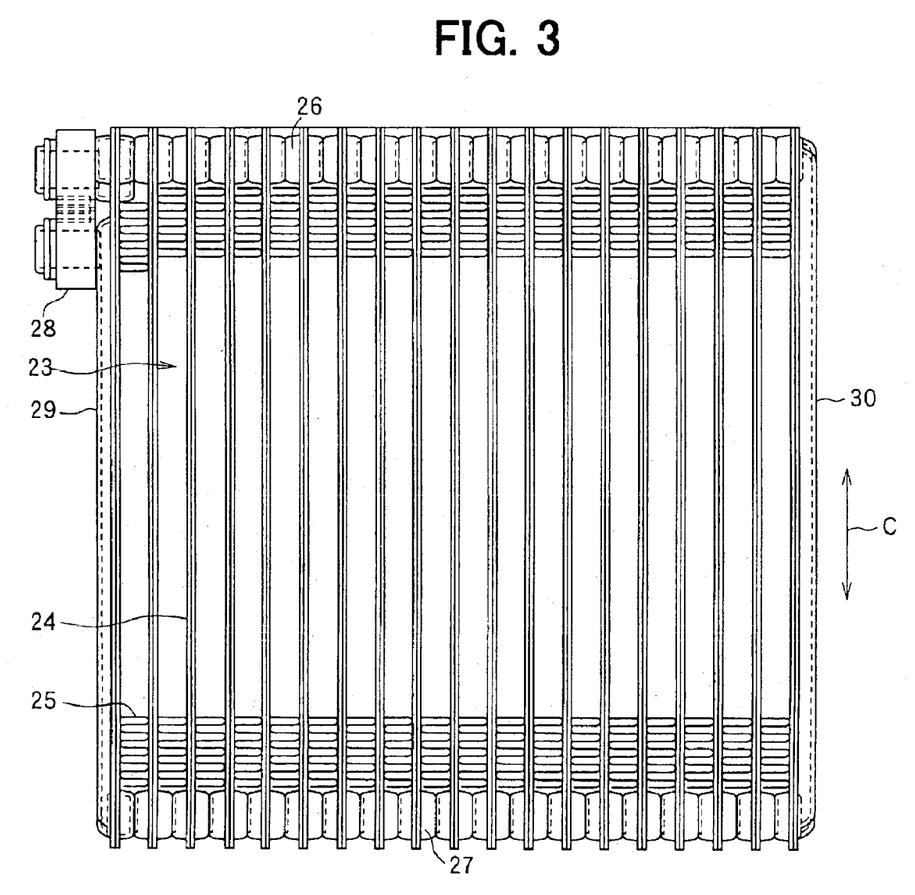
FIG. 3 is a front view showing an evaporator according to the first embodiment.

On the other hand, the evaporator 23 (cooling heat exchanger) of the heat-exchanging portion 12 is disposed substantially horizontally in the vehicle right-left direction and in the vehicle front-rear direction, at a direct upper side of the blower fan 16. Here, the structure and the arrangement layout of the evaporator 23 will be now described in detail. As shown in FIG. 3, the evaporator 23 includes plural flat tubes 24 defining plural refrigerant passages, plural corrugated fins 25 each of which is disposed between adjacent tubes 24, both tank portions 26, 27 connected to both longitudinal ends of each tube 24, and a refrigerant joint 28. Through the tank portions 26, 27, the plural refrigerant passages of the plural tubes 24 communicate with each other. In addition, side plates 29, 30 are disposed at both sides of the evaporator 23 in a stacking direction (right-left direction in FIG. 3) of the tubes 24. Members for forming the evaporator 23 are made of a metal having a sufficient heat conductivity such as an aluminum, and are assembled integrally by brazing.

Figure 4A:
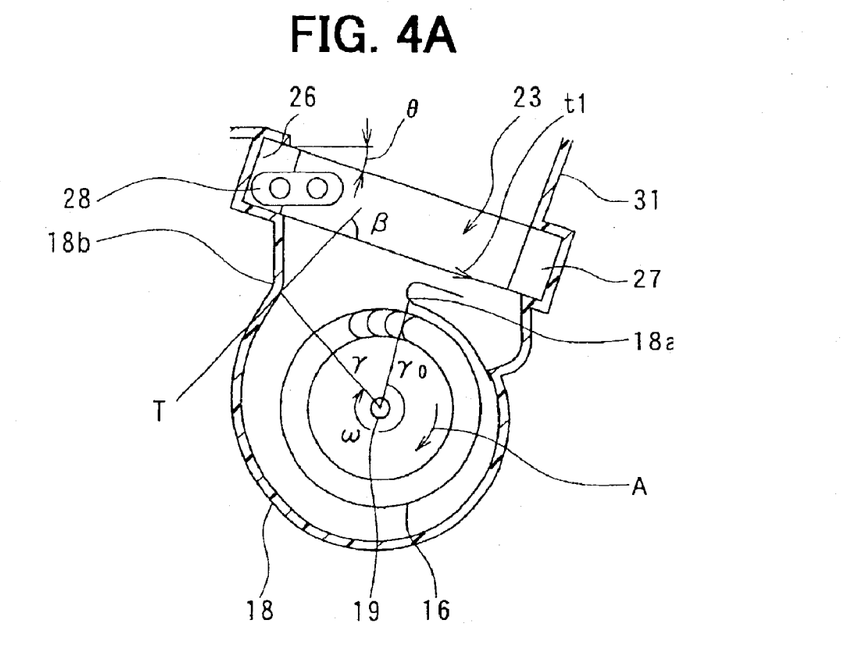
FIG. 4A is a schematic sectional view of a main part of the interior unit, for explaining a scroll winding angle (ω) from a scroll start portion, and a tangential line (T) at a scroll finish portion of a scroll casing of a blower, according to the first embodiment.
Figure 4B:
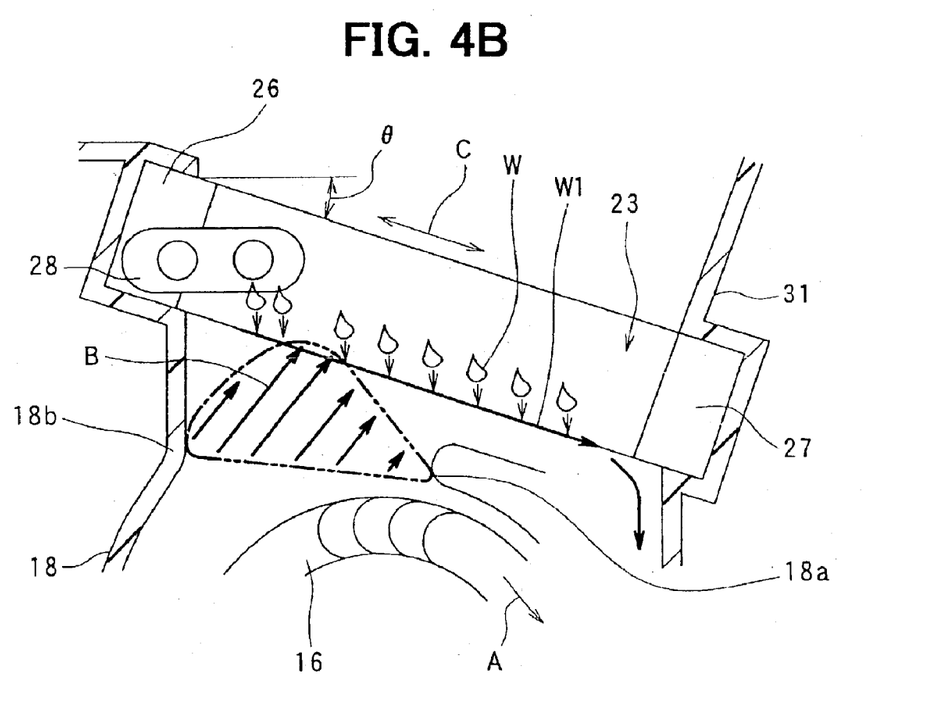
FIG. 4B is an enlarged view of the main part of FIG. 4A, showing a main air flow substantially parallel to the tangential line at the scroll finish portion, and an air flow distribution at an air outlet of the scroll casing.

The evaporator 23 is tilted from a horizontal surface by a slight tilt angle θ (e. g., 20°) downwardly toward a vehicle rear side so that a rear side end of the evaporator 23 becomes lower than a front side end of the evaporator 23, as shown in FIGS. 4A and 4B. That is, the evaporator 23 is disposed so that the tank portion 26 having the refrigerant joint 28 is positioned at the vehicle front side and the tank portion 27 is positioned at the vehicle rear side. The refrigerant joint 28 is provided in the evaporator 23 so that refrigerant is introduced into or discharged from the evaporator 23 through the joint 28.

In the first embodiment, the tilt direction (t1 in FIG. 4A) of the evaporator 23 can be set to correspond to the longitudinal direction C (refrigerant flow direction) of the tubes 24. Further, because the joint 28 can be disposed at the vehicle front side in the evaporator 23, a connection between the refrigerant joint 28 and a refrigerant pipe (not shown) on a side of an engine compartment can be made easy.

Figure 5A:
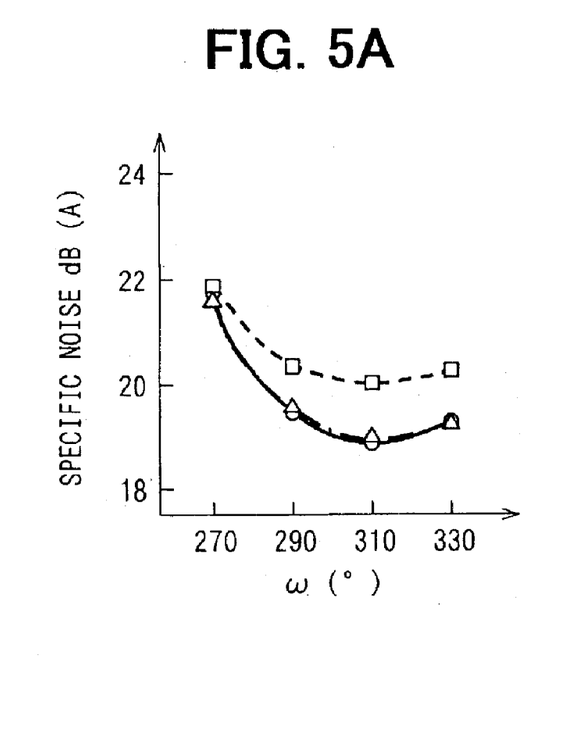
FIG. 5A is a graph showing a relationship between the scroll winding angle (ω) of the scroll casing and specific noise dB (A) in the blower.
Figure 5B:
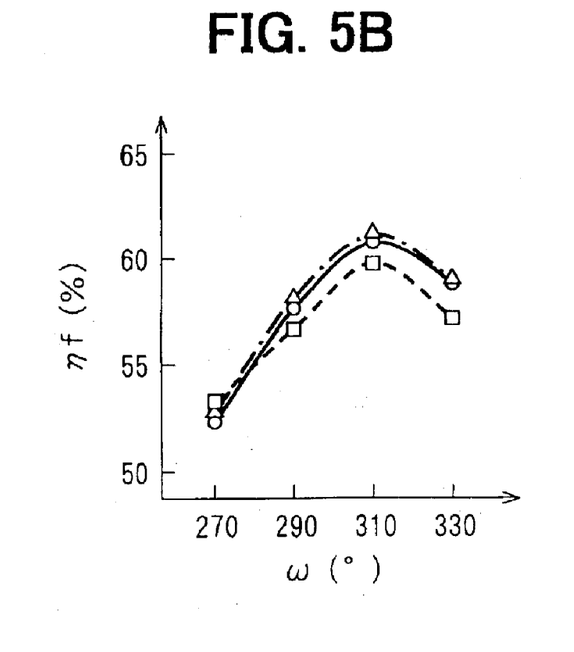
FIG. 5B is a graph showing a relationship between the scroll winding angle (ω) of the scroll casing and a fan efficiency ηf (%) in the blower.

As shown in FIG. 4A, because the evaporator 23 is disposed to be tilted from the horizontal surface by the slight tilt angle θ so that the vehicle rear portion of the evaporator 23 becomes lower than the vehicle front portion of the evaporator 23, air blown by the blower fan 16 is introduced into a bottom heat exchanging surface of the evaporator 23 from below and flows through the evaporator 23 upwardly. In the first embodiment, the scroll casing 18 is formed such that a radial dimension y from the center portion 19 of the centrifugal fan 16 to a radial peripheral surface of the scroll casing 18 is gradually increased from the scroll start portion (nose portion) 18a toward the scroll finish portion 18b as a scroll winding angle ω increases. At the scroll finish portion 18b, the scroll winding of the scroll casing 18 is finished. In FIG. 4A, the radial dimension at the scroll finish portion 18b is indicated by y, and the radial dimension at the scroll start portion 18a is indicated by $y_o$. Generally, the scroll casing 18 is set to satisfy the formula of $y=y_o \exp(\omega \tan \alpha_o)$. Here $\alpha_o$ is a scroll expending angle, and ω is the scroll winding angle. Generally, the scroll expending angle $\alpha_o$ is set in a range of 5–7. According to the experiments, as shown in FIGS. 5A, 5B, when the scroll winding angle ω is in a range between 290°–330°, the specific noise dB can be effectively reduced, and the fan efficiency can be effectively increased. More preferably, the scroll winding angle ω is set in a range between 290°–310°.

Further, in the first embodiment, as shown in FIG. 4A, the scroll casing 18 and the evaporator 23 are disposed such that a tangential line (T) at the scroll finish portion 18b is crossed with the bottom heat-extending surface in the tilt direction t1 of the evaporator 23 by an acute angle β. In addition, the scroll start portion (nose portion) 18a of the scroll casing 18 is disposed at the tilted lower side (vehicle rear side) of the evaporator 23, and the scroll finish portion 18b is disposed at the tilted upper side (the vehicle front side) of the evaporator 23. Accordingly, a main flow of air blown by the blower fan 16 is toward the tilted upper portion on the vehicle front side among the evaporator 23, as shown by arrows B in FIG. 4B. That is, the main flow of air blown by the blower fan 16 is substantially parallel with the tangential line T, and is toward the vehicle front side position higher than a center portion of the evaporator 23, in the tilt direction ti (tube longitudinal direction C) of the evaporator 23. As shown by the arrows B in FIG. 4B, because the direction of the main flow is substantially parallel to the tangential line T, condensed water on the bottom heat-exchanging surface of the evaporator 23 is pushed downwardly in the tilt direction t1 due to the component force of the main flow of air blown from the centrifugal fan 16 acting in the tilt direction t1. Here, the main flow means an air flow having a high flow rate in an air flow distribution.

In FIG. 4B, the arrows B indicates an air flow distribution in an air passage section surface of the scroll casing 18, connecting the scroll start portion (nose portion) 18a and the scroll finish portion 18b. The air flow at a side of the scroll finish portion 18b becomes higher than that at a side of the scroll start portion 18a, by the centrifugal force applied to the air flow. Accordingly, the main flow portion of air blown by the blower fan 16 is biased to the scroll finish portion 18b of the scroll casing 18, and the main flow of air is toward the tilted upper position on the vehicle front side of the evaporator 23.

The scroll casing 18 and a resinous case 31 connected to an upper side of the scroll casing 18 are formed to be divided into both parts in the vehicle right-left direction at a division line 32, and both the divided cases are integrally fastened using a fastening member such as a metal screw, a clip and a screw. A receiving portion is provided in the resinous case 31 at a direct lower side under the tilt lower end of the evaporator 23, and an upper end of a drain pipe 33 is connected to a drain port of the receiving portion. Accordingly, condensed water falling onto the receiver portion of the case 31 can be discharged to an outside of the vehicle through the drain pipe 33.

On the other hand, a heater core 34 (heating heat exchanger) is disposed approximately horizontally in the case 31 at a vehicle upper side of the evaporator 23 on a vehicle front side position so that air after passing through the evaporator 23 flows into the heater core 34. The heater core 34 is disposed for heating air passing therethrough using engine-cooling water (hot water) as a heating source. The heater core 34 is disposed at the vehicle front side position within the case 31 so that a hot-water pipe 34a for introducing and discharging hot water in the heater core 34 can protrude toward a vehicle front side from the case 31. Therefore, a connection between the hot-water pipe 34a of the heater core 34 and a hot-water pipe from the engine compartment can be made simple.

The heater core 34 is disposed at the vehicle front side within the case 31 so that a bypass passage 35 is formed at a vehicle rear side from the heater core 34 within the case 31. A plate-like slide air-mixing door 36 is disposed at a lower side of the heater core 34 and at an upper side of the evaporator 23 to be slidable in the vehicle front-rear direction. In the first embodiment, the slide air-mixing door 36 is used as a temperature adjusting member for adjusting temperature of air blown into the passenger compartment. That is, by a slide operation of the air mixing door 36 in the vehicle front-rear direction, a ratio between an air amount passing through the heater core 34 and an air amount passing through the bypass passage 35 is adjusted, so that the temperature of air blown into the passenger compartment can be adjusted. Because the air mixing door 36 is disposed to be slidable in the vehicle front-rear direction, an arrangement space of the air mixing door 36 in the vehicle up-down direction can be reduced.

A warm air passage 37, through which warm air after passing through the heater core 34 flows as shown by arrow D in FIG. 1 from the vehicle front side toward the vehicle rear side, is formed at an upper side of the heater core 34. This warm air D from the warm air passage 37 and cool air E from the bypass passage 35 are mixed in an operation space of a rotary door 38 used for switching an air outlet mode, and mixed air having a predetermined temperature is blown into the passenger compartment. That is, in the first embodiment, the operation space of the rotary door 38 for switching the air outlet mode is also used as an air mixing chamber.

The rotary door 38 is formed into a semi-cylindrical shape or a cylindrical shape extending in the vehicle right-left direction, and both end portions of the rotary door 38 in an axial direction (vehicle right-left direction) are integrated with a rotation shaft 39 by using a resin. The rotary door 38 has a semi-cylindrical or a cylindrical circumference surface separated from the rotation shaft 39 of the rotary door 38 in a radius direction, and the circumference surface of the rotary door 38 is used as a door surface for opening and closing plural openings 40–42. That is, by the rotation of the rotary door 38, a face opening 40, a foot opening 41 and a defroster opening 42 can be selectively opened and closed using the door surface. The openings 40, 41, 42 are provided at predetermined intervals in a circumferential direction of the door surface of the rotary door 38.

The face opening 40 is provided at an upper side of the operation space of the rotary door 38 to be opened toward the vehicle rear side. The face opening 40 communicates with a face air outlet from which air is blown toward the upper side (the head side of a passenger) within the passenger compartment. Further, the face opening 40 is placed approximately on an extending line of the main flow B of air blown from the outlet of the scroll casing 18, as shown in FIG. 1. Therefore, in a maximum cooling mode where the bypass passage 35 is fully opened, cool air after passing through the evaporator 23 can be introduced into the face opening 40 with a small air flow resistance.

The foot opening 41 is provided at a lower side of the operation space of the rotary door 38 to be opened downwardly, and left and right foot ducts 43, 44 extending downwardly are connected to the foot opening 41. Both foot air outlets 45, 46 are connected to lower ends of the left and right foot ducts 43, 44, respectively, so that air is blown toward the foot area in the passenger compartment from the foot air outlets 45, 46.

The defroster opening 42 is provided at an upper side of the operation space of the rotary door 38 to be opened toward the vehicle front side, and communicates with a defroster outlet (not shown) from which air can be blown toward an inner surface of a windshield. Because the plural openings 40–42 arranged in the circumferential direction can be selectively opened and closed by the rotation of the rotary door 38, the size of the mode switching portion 13 can be reduced in vertical the up-down direction.

Next, the operation of the vehicle air conditioner according to the first embodiment of the present invention will be now described. Air flowing from the inside/outside air introduction ducts 14, 15 is blown in the scroll casing 18 along the scroll shape by the blower fan 16 having both the air suction ports, is blown toward a rear upper side as shown by the arrow B from the scroll finish portion 18b positioned at the vehicle front side in the scroll casing 18, and passes through the evaporator 23 from below upwardly. Thereafter, while air passes through the evaporator 23, air is cooled and dehumidified.

Cool air from the evaporator 23 is introduced into the heater core 34 and the bypass passage 35 in accordance with the slide position of the air mixing door 36, and warm air from the heater core 37 and cool air from the bypass passage 35 are mixed in the operation space of the rotary door 38 so that conditioned air having a predetermined temperature can be obtained. Thereafter, conditioned air having the predetermined temperature is blown into the passenger compartment through at least one of the face opening 40, the foot opening 41 and the defroster opening 42.

According to the arrangement layout of the interior unit 10, the evaporator 23 is disposed substantially horizontally so that air passes through the evaporator 23 from below upwardly. Therefore, the fall direction of condensed water is basically opposite to the air blowing direction. However, in the first embodiment of the present invention, as shown in FIGS. 4A and 4B, the evaporator 23 is disposed to be tilted by the predetermined angle θ relative to the horizontal surface, and the tilt direction t1 of the evaporator 24 is the same as the tube longitudinal direction C of the tubes 24. Therefore, condensed water W (see FIG. 4B) generated on the evaporator 23 collects on the bottom heat-exchanging surface by the weight, and moves toward the tilt lower end of the evaporator 23 on the bottom surface of each tube 24 along the tube longitudinal direction C as shown by the arrow W1 to be collected at the tilt lower end.

Here, because the main flow B of air blown by the blower fan 16 is toward the tilted upper position on the vehicle front side of the evaporator 23, condensed water can readily fall from the lower end of the tilted evaporator 23. If the main flow B of blown air is toward the lower end on the tilted heat exchanging surface of the evaporator 23, condensed water staying at the lower end of the tilted evaporator 23 is pressed by the air pressure of the main flow, and condensed water cannot fall smoothly. In this case, the draining performance of condensed water is deteriorated.

However, in the first embodiment of the present invention, by using the characteristics that the air flow distribution in the scroll finish portion 18b is larger than that of the scroll start portion 18a in the air outlet of the scroll casing 18 of the blower 11, the evaporator 23 is disposed to be slightly tilted relative to the horizontal direction, so that the scroll start portion (nose portion) 18a of the scroll casing 18 is disposed at the lower side (vehicle rear side) of the tilted evaporator 23, and scroll finish portion 18b is disposed at the upper side (vehicle front side) of the tilted evaporator 23. Accordingly, the main flow B of blown air under the evaporator 23 is toward the upper side of the tilted evaporator 23 on the vehicle front side, and condensed water staying at the lower end of the tilted evaporator 23 is not disturbed by the air pressure of the main flow B to smoothly move downwardly. Further, because the direction of the main flow B of air blown upwardly is substantially parallel to the tangential direction T at the finishing portion 18b, the direction of the main flow of air is crossed with the tilted direction t1 by an acute angle, and the condensed water W can be effectively discharged along the direction W1 (tilt direction t1) by the component force of main air flow in the tilt direction t1. Therefore, the draining performance of condensed water can be further improved: As a result, even when the evaporator 23 is arranged approximately horizontally so that air passes through the evaporator 23 upwardly from below, condensed water can be smoothly discharged from the evaporator 23 to an outside of the vehicle.

Further, in the first embodiment of the present invention, the axial direction of the blower 11 is positioned in the vehicle right-left direction, and the blower 11 is the both-side suction type. Therefore, the interior unit 10 can be used for a vehicle having a right steering wheel or a vehicle having a left steering wheel.

In addition, in the maximum cooling where the bypass passage 35 is fully opened, the main flow B of air blown by the blower 11 can be introduced into the face opening 40 approximately linearly through the evaporator 23, the bypass passage 35 and the operation space of the rotary door 38. Therefore, in the maximum cooling, air flow resistance can be reduced, the air amount blown into the passenger compartment can be increased, and maximum cooling capacity can be improved.

By the combination of the blower fan 16 of the both-sides suction type, the slide air mixing door 36 and the rotary door 38, an entire height dimension of the interior unit 10 can be effectively reduced.

Figure 6:
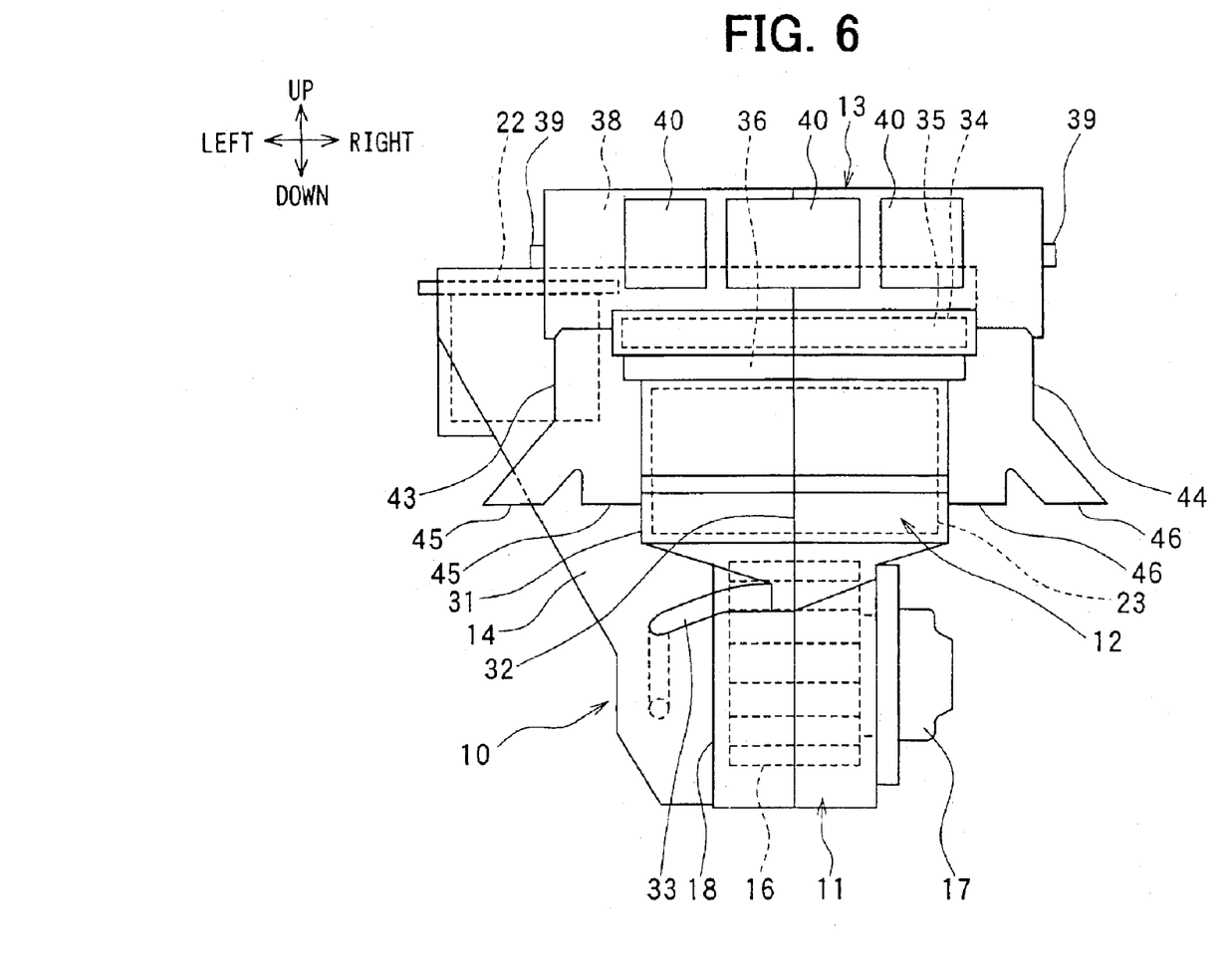
FIG. 6 is a front view of an interior unit disposed in a passenger compartment when being viewed from an inner side of the passenger compartment, according to a second preferred embodiment of the present invention.

A second preferred embodiment of the present invention will be now described with reference to FIG. 6. In the above-described first embodiment of the present invention, the centrifugal blower 11 is the both-sides suction type in which air can be sucked into the centrifugal fan 16 from right and left both sides. However, in the second embodiment, as shown in FIG. 6, the centrifugal blower 11 is a one-side suction type. That is, in the second embodiment, in a vehicle having a right steering wheel, the inside/outside air introduction duct 15 provided at the right side is omitted, so that air is sucked into the centrifugal fan 16 only from the inside/outside air introduction duct 14 provided at the left side (front passenger's side). In the second embodiment, the other parts are similar to those of the above-described first embodiment.

On the other hand, in a vehicle having a left steering wheel, conversely to that of FIG. 6, the blower fan 16 is disposed so that air is sucked only from the inside/outside air introduction duct 15 provided at the vehicle right side (front passenger's side). Thus, similarly to the above-described first embodiment, the mounting space of the interior unit 10 on the vehicle can be reduced, and draining performance of condensed water can be improved.

A third preferred embodiment of the present invention will be now described with reference to FIGS. 7 and 8. In the third embodiment, the arrangements of the centrifugal blower 11, the evaporator 23 and the inside/outside air introduction ducts 14, 15, described in the first embodiment, are changed. That is, in the third embodiment, the rotation axis 19 of the blower fan 16 is positioned in the vehicle front-rear direction so that air is sucked into the blower fan 16 from both vehicle front and rear sides. Therefore, in the third embodiment, the lower end sides of the inside/outside air introduction ducts 14, 15 are branched, respectively, to be connected to front and rear suction ports of the blower fan 16. On the other hand, the evaporator 23 is tilted in the vehicle right-left direction as shown in FIG. 8. For example, in FIG. 8, the evaporator 23 is tilted relative to the horizontal surface, so that the tank portion 26 provided at the left side of the evaporator 23 becomes higher, and the tank portion 27 provided at the right side of the evaporator 23 becomes lower.

Even in this arrangement layout of the interior unit 10 according to the third embodiment, because the main flow B of air blown by the blower fan 16 is toward the tilted upper position on the vehicle left side in the evaporator 23, the draining performance of condensed water can be improved similarly to the above-described first embodiment.

Figure 7:
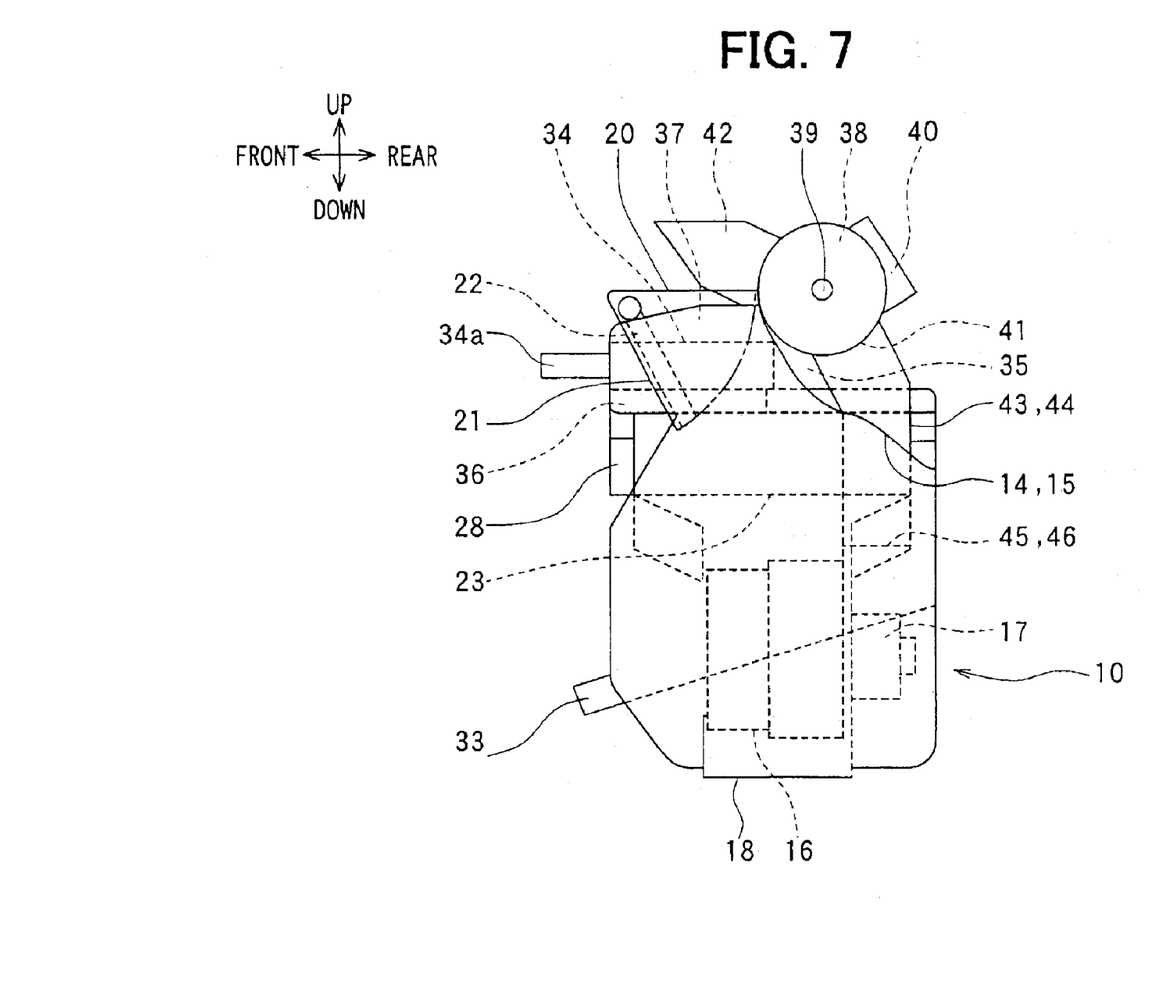
FIG. 7 is a side view showing an interior unit disposed in a passenger compartment, according to a third preferred embodiment of the present invention.
Figure 8:
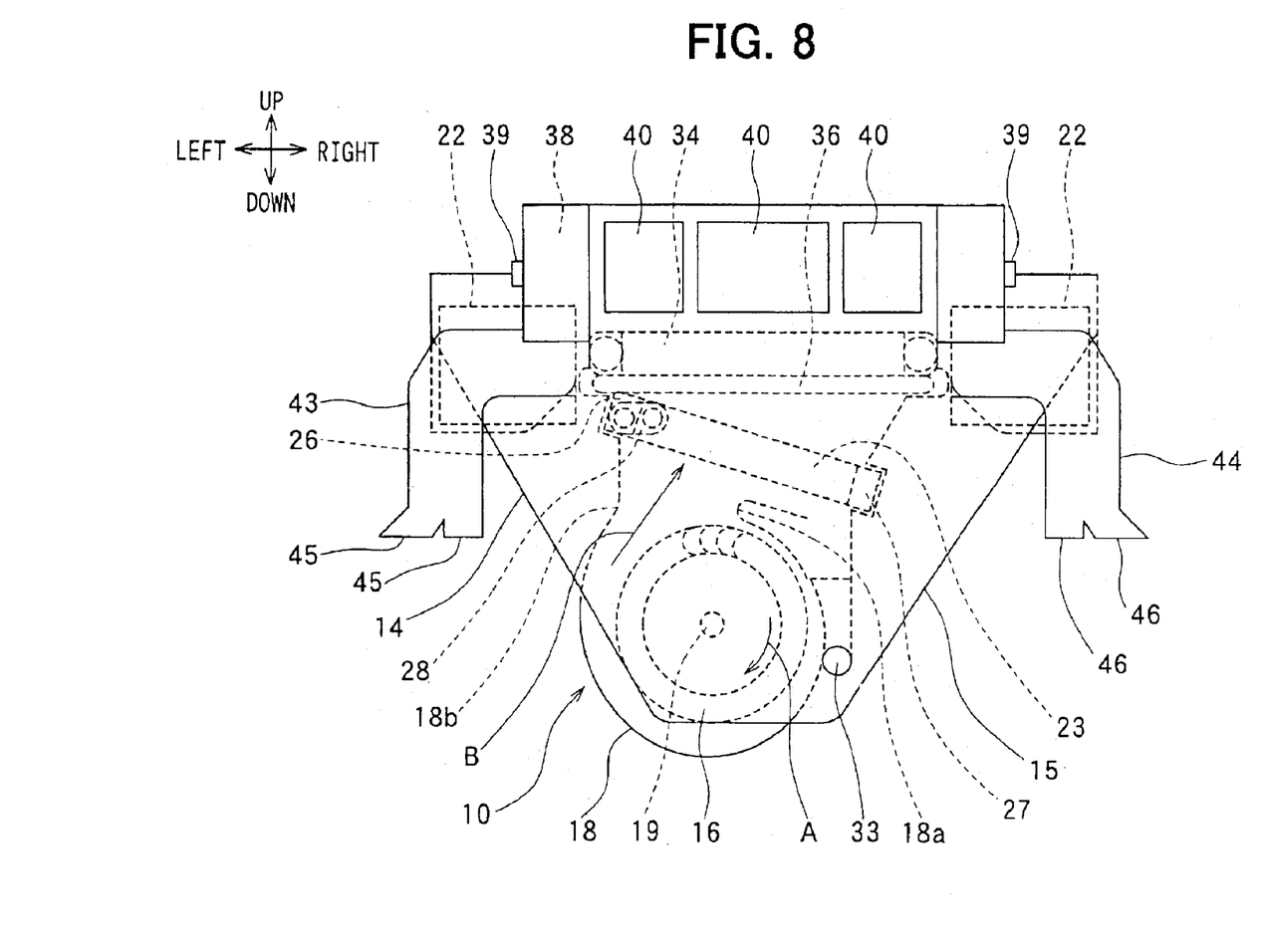
FIG. 8 is a front view of the interior unit when being viewed from an inner side of the passenger compartment, according to the third embodiment.

In addition, in the third embodiment of the present invention, as shown in FIG. 7, the refrigerant joint 28 of the evaporator 23 can be positioned to be toward the vehicle front side (engine compartment side). Therefore, the connection between the refrigerant joint 28 and a refrigerant pipe (not shown) from the side of the engine compartment can be made further simple.

Figure 9:
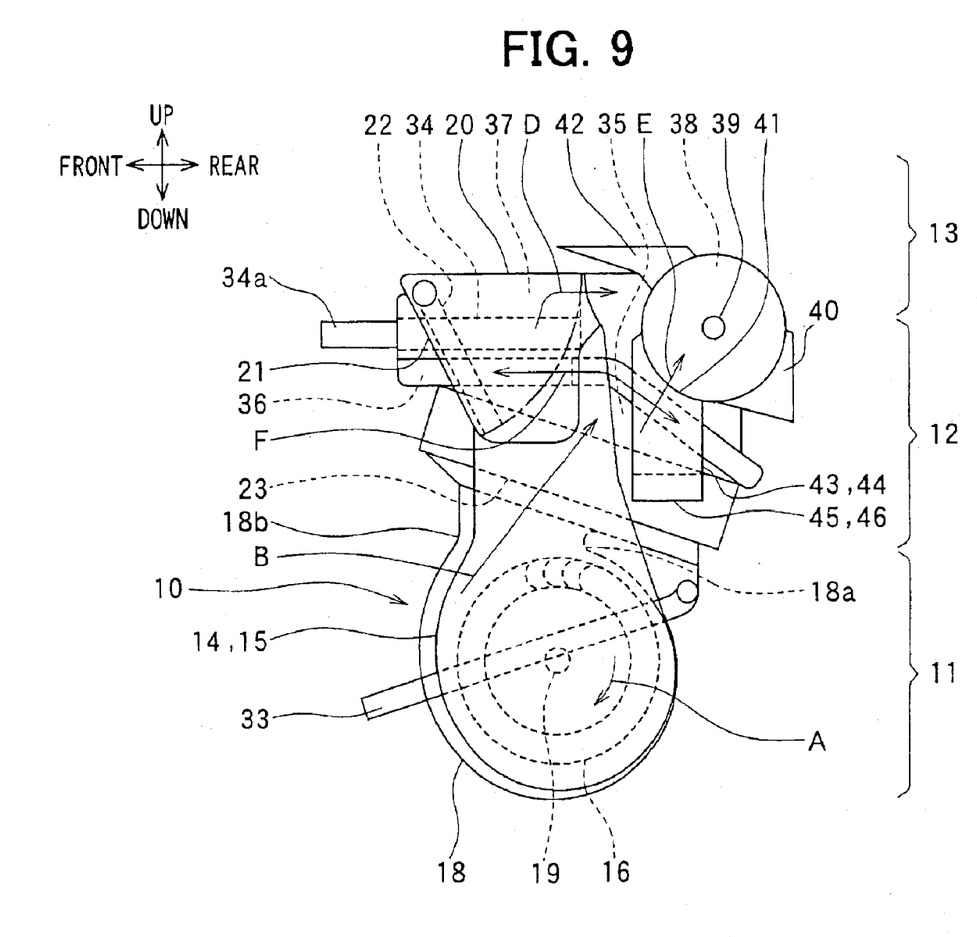
FIG. 9 is a side view showing an interior unit disposed in a passenger compartment, according to a fourth preferred embodiment of the present invention.

A fourth preferred embodiment of the present invention will be now described with reference to FIG. 9. In the above-described first through third embodiments, for linearly moving the slide air mixing door 36, the rotary door 38 is disposed upper from a horizontal moving route of the air mixing door 36. However, in the fourth embodiment of the present invention, the moving route of the slide air mixing door 36 is bent as shown by arrow F in FIG. 9 at a lower side of the rotary door 38. In the fourth embodiment, the air mixing door 36 is constructed by a flexible member elastically deformable, such as a resinous film material, and both sides of the air mixing door 36 in the width direction are guided by a guide member, so that the air mixing door 36 moves in the bent route. In the fourth embodiment, the height position of the rotary door 38 can be lowered, and the entire height dimension of the interior unit 10 can be further reduced.

A fifth preferred embodiment of the present invention will be now described with reference to FIGS. 10 and 11. In the above-described third embodiment, the inside/outside air introduction ducts 14, 15 are disposed at both the left and right sides of the interior unit 10. However, in the fifth embodiment, the inside/outside air introduction duct 14 is only disposed at the front-passenger's side (left or right side) of the interior unit 10 so that air can be sucked into both the front and rear side suction ports of the blower fan 16 from the inside/outside air introduction duct 14.

Inside the instrument panel at the front side within the passenger compartment, the mounting space is relatively readily obtained at the front-passenger's side. Therefore, in the fifth embodiment, the size of the inside/outside air introduction duct 14 can be readily increased at the front-passenger's side next to the driver's side. In the fifth embodiment, the inside/outside air introduction duct 14 is enlarged at the front-passenger's side, so that an arrangement space of a filter for cleaning air can be increased in the inside/outside air introduction duct 14. Accordingly, a filter 50 having a large air passing area can be used, and a pressure loss in the filter 50 can be reduced.

Figure 10:
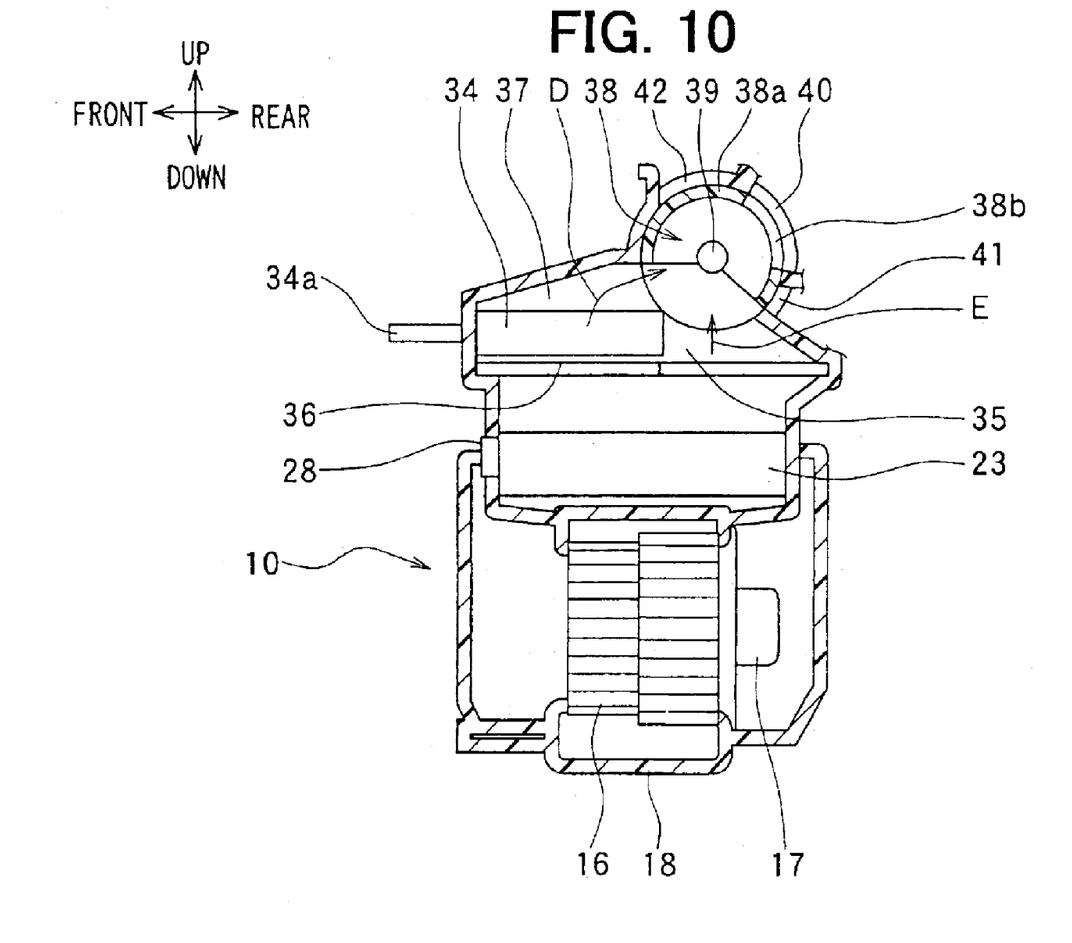
FIG. 10 is a side sectional view showing an interior unit disposed in a passenger compartment, according to a fifth preferred embodiment of the present invention.
Figure 11:
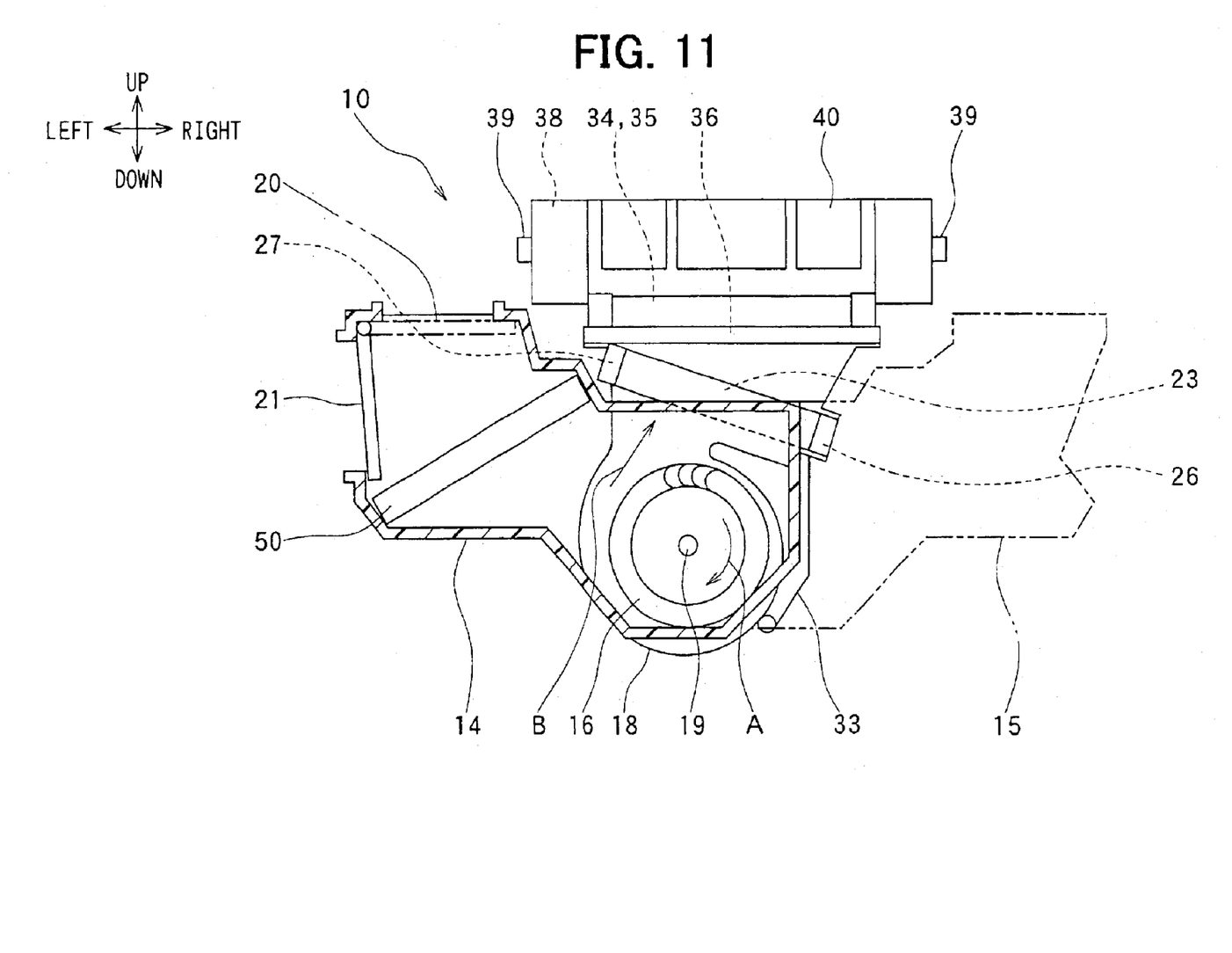
FIG. 11 is a partial-sectional front view showing the interior unit according to the fifth embodiment.

FIG. 10 shows a state, where a communication path 38b is opened in a semi-circular cylindrical door surface 38a of the rotary door 38, and the face opening 40 is opened by the communication port 38b provided in the door surface 38a of the rotary door 38.

Figure 12:
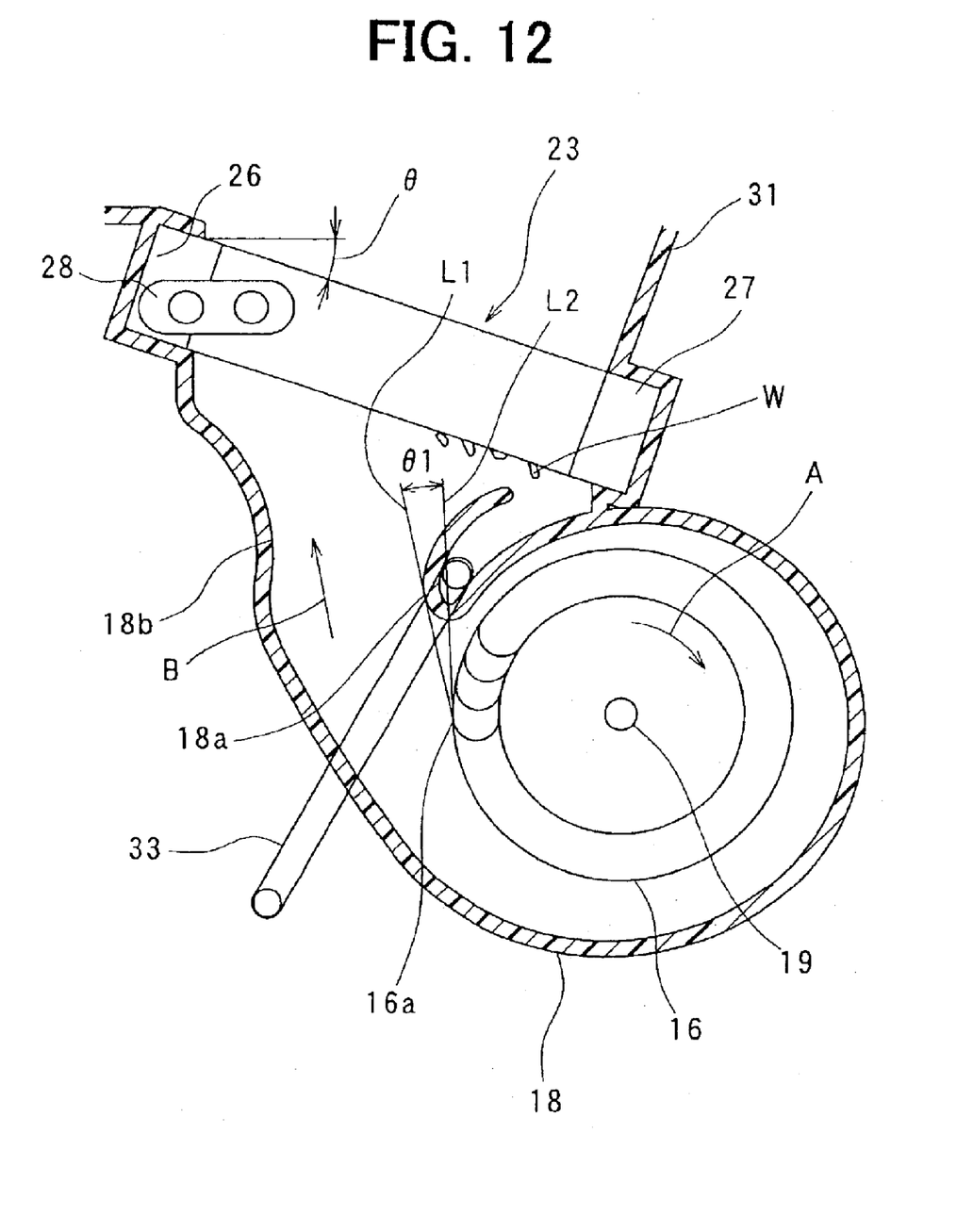
FIG. 12 is a side sectional view showing a main part of an interior unit disposed in a passenger compartment according to a sixth preferred embodiment of the present invention.

A sixth preferred embodiment of the present invention will be now described with reference to FIG. 12. In the above-described embodiments of the present invention, because the scroll start portion (nose portion) 18a of the scroll casing 18 is positioned around a center portion on the upper side of the blower fan 16 in a fan radial direction, a part of the blower fan 16 is exposed when being viewed from an upper side of the blower fan 16. Therefore, at a moment immediately after the blower 11 is stopped, condensed water falls from a bottom surface of the evaporator 23, and may fall onto the blower fan 16 rotated by the inertia. Further, even in the operation of the blower 11, condensed water may fall from the bottom surface of the evaporator 23 by a vertical vibration of the vehicle, and may fall onto the blower fan 16. When the condensed water falls onto the rotating blower fan 16, a noise is generated.

In the sixth embodiment, it is an object for preventing the noise. As shown in FIG. 12, the upper side of the blower fan 16 is covered by the scroll start portion 18a of the scroll casing 18 so that the blower fan 16 is not exposed when being viewed from the upper side of the blower fan 16.

Specifically, a connection line L1 connecting the scroll start portion 18a of the scroll casing 18 and an outer peripheral portion 16a of the blower fan 16, positioned at a lower side of the scroll start portion 18a, is set to be positioned at a left side relative to a vertical line L2 passing through the outer peripheral portion 16a. That is, the scroll start portion 18a is set so that the connection L1 is tilted relative to the vertical line L2 by a predetermined angle θ1 to be away from the blower fan 16. In this sixth embodiment, for example, the predetermined angle θ1 is equal to or more than 15°. Accordingly, the upper side of the blower fan 16 is completely covered by the scroll start portion 18a of the scroll casing 18, and the blower fan 16 is not exposed when being viewed from the upper side of the blower fan 16.

Thus, even when the condensed water W falls from the bottom surface of the evaporator 23 at the moment immediately after the stop of the blower 11 or by the vertical vibration of the vehicle, condensed water W does not fall onto the blower fan 16. Accordingly, it can prevent a noise generated when the condensed water W falls onto the rotating blower fan 16.

According to experiments by the inventors of the present invention, when the predetermined angle θ1 is set at 15° or more, it can accurately prevent the condensed water W from falling onto the blower fan 16, and the noise can be effectively prevented. In the sixth embodiment, the other parts are similar to those of the above-described first embodiment.

Although the present invention has been fully described in connection with the preferred embodiments thereof with reference to the accompanying drawings, it is to be noted that various changes and modifications will become apparent to those skilled in the art.

In the above-described embodiment, as the temperature adjustment member, the air mixing door 36, for adjusting the ratio between the air amount passing through the heater core 34 and the air amount passing through the bypass passage 35 of the heater core 34, is used. However, as the temperature adjustment member, a hot water control valve (not shown) for controlling a flow amount or a temperature of hot water flowing into the heater core 34 can be used. In this case, the flow amount or the temperature of hot water flowing into the heater core 34 can be controlled by the hot water control valve, and the temperature of air blown into the passenger compartment can be adjusted by an air-heating amount due to the heater core 34.

In the above-described embodiments, the present invention is applied to the interior unit 10 disposed under the instrument panel at the front side within the passenger compartment. However, the present invention may be applied to a rear interior unit disposed at a vehicle rear side in the passenger compartment for air-conditioning a vehicle rear side in the passenger compartment.

Such changes and modifications are to be understood as being within the scope of the present invention as defined by the appended claims.

What is claimed is:

1. An air conditioner for a vehicle, comprising:

a blower for blowing air;

a cooling heat exchanger for cooling air blown by the blower, the cooling heat exchanger being disposed entirely above the blower in such a manner that air blown from the blower is directly introduced to the cooling heat exchanger and passes through the cooling heat exchanger upwardly from below, wherein:

the cooling heat exchanger has a bottom heat-exchanging surface and is tilted downwardly in a tilt direction (t1) by a predetermined angle (θ) relative to a horizontal surface;

the blower has a centrifugal fan for blowing air, and a scroll casing for accommodating the centrifugal fan;

the scroll casing is disposed such that a dimension γ from a center of the centrifugal fan to a radial peripheral surface of the scroll casing is gradually increased from a scroll start portion to a scroll finish portion, and air is mainly blown toward the cooling heat exchanger in a direction substantially parallel to a tangential line (T) at the scroll finish portion; and the blower is disposed such that an extension line of the tangential line (T) intersects the bottom heat-exchanging surface to form an acute angle with respect to the tilt direction.

2. The air conditioner according to claim 1, wherein:

the scroll casing is formed into a scroll shape having a scroll winding angle from the scroll start portion toward the scroll finish portion; and the scroll winding angle at the scroll finish portion is in a range of 290°–310°.

3. The air conditioner according to claim 1, wherein:

the scroll start portion is positioned under the cooling heat exchanger at a lower end of the tilted cooling heat exchanger; and the scroll finish portion is positioned under the cooling heat exchanger at an upper end of the tilted cooling heat exchanger.

4. The air conditioner according to claim 1, wherein:

the scroll start portion is a nose portion of the scroll casing;

the bottom heat-exchanging surface of the cooling heat exchanger is tilted to have an upper end and a lower end in the tilt direction; and the nose portion is positioned under the cooling heat exchanger at the lower end.

5. The air conditioner according to claim 1, wherein the blower is a two-side suction type, in which air is sucked into the centrifugal fan from two suction ports at two sides in an axial direction.

6. The air conditioner according to claim 5, further comprising first and second air introduction ducts through which air is introduced into both the air suction ports, the first and second air introduction ducts being disposed at both sides of the cooling heat exchanger and the blower arranged in a vehicle up-down direction, wherein the first and second air introduction ducts are connected to both of the air suction ports.

7. The air conditioner according to claim 1, further comprising a mode switching member for switching an air outlet mode for setting a flow direction of air blown into a passenger compartment of the vehicle, wherein the mode switching member is disposed above the cooling heat exchanger.

8. The air conditioner according to claim 7, further comprising a case defining an air passage through which air is blown by the blower flows into the passenger compartment, wherein:

the cooling heat exchanger is disposed in the case;

the case has a plurality of openings through which air after passing through the cooling heat exchanger flows into the passenger compartment;

the mode switching member is a rotary door having a rotation shaft and a door surface placed at a predetermined radial position from the rotation shaft to extend in a rotation direction of the rotation shaft; and the rotary door is disposed to open and close the openings by using the door surface.

9. The air conditioner according to claim 1, further comprising
a heating heat exchanger, for heating air from the cooling heat exchanger, disposed above the cooling heat exchanger.

10. The air conditioner according to claim 9, further comprising:
an air mixing door disposed to adjust a ratio between an air amount passing through the heating heat exchanger and an air amount bypassing the heating heat exchanger,
wherein the air mixing door is a slidable door disposed to be slidable in an approximate horizontal direction.

11. The air conditioner according to claim 9, further comprising:
a case defining an air passage through which air is blown by the blower flows into a passenger compartment of the vehicle, wherein:
the heating heat exchanger is disposed in the case above the cooling heat exchanger on a vehicle front side to define a bypass passage at a vehicle rear side from the heating heat exchanger, in such a manner that air from the cooling heat exchanger passes through the bypass passage while bypassing the heating heat exchanger.

12. The air conditioner according to claim 1, wherein the cooling heat exchanger is tilted in such a manner that a vehicle front side end of the cooling heat exchanger becomes higher than a vehicle rear side end of the cooling heat exchanger.

13. The air conditioner according to claim 1, wherein:
the cooling heat exchanger includes a plurality of flat tubes through which refrigerant flows, and a plurality of corrugated fins each of which is disposed between adjacent tubes; and
the cooling heat exchanger is tilted in a tube longitudinal direction.

* * * * *